(12) United States Patent
Chou et al.

(10) Patent No.: US 10,817,047 B2
(45) Date of Patent: Oct. 27, 2020

(54) TRACKING SYSTEM AND TACKING METHOD USING THE SAME

(71) Applicant: XRSpace CO., LTD., Taoyuan (TW)

(72) Inventors: Peter Chou, Taipei (TW); Chun-Wei Lin, Taoyuan (TW); Yi-Kang Hsieh, Hsinchu County (TW); Chia-Wei Wu, New Taipei (TW)

(73) Assignee: XRSpace CO., LTD., Taoyuan (TW)

( * ) Notice: Subject to any disclaimer, the term of this patent is extended or adjusted under 35 U.S.C. 154(b) by 0 days.

(21) Appl. No.: 16/136,198

(22) Filed: Sep. 19, 2018

(65) Prior Publication Data

US 2020/0089311 A1    Mar. 19, 2020

(51) Int. Cl.
    *G06F 3/01*     (2006.01)
    *G02B 27/01*    (2006.01)
    *G06F 3/033*    (2013.01)

(52) U.S. Cl.
    CPC .......... *G06F 3/011* (2013.01); *G02B 27/0172* (2013.01); *G06F 3/017* (2013.01); *G06F 3/0334* (2013.01)

(58) Field of Classification Search
    CPC .......... G06F 3/0334; G06F 3/011–017; G06F 3/0346; G02B 27/0172; G02B 27/01; G02B 27/017; G02B 2027/017
    See application file for complete search history.

(56) References Cited

U.S. PATENT DOCUMENTS

| | | | |
|---|---|---|---|
| 7,301,648 B2 | 11/2007 | Foxlin | |
| 7,542,040 B2 | 6/2009 | Templeman | |
| 7,636,645 B1 * | 12/2009 | Yen | A63F 13/02 702/152 |
| 2007/0003915 A1 * | 1/2007 | Templeman | G06F 3/011 434/247 |
| 2011/0009241 A1 | 1/2011 | Lane | |
| 2011/0270135 A1 * | 11/2011 | Dooley | G16H 50/30 600/595 |

(Continued)

FOREIGN PATENT DOCUMENTS

| | | |
|---|---|---|
| EP | 3 067 783 A1 | 9/2016 |
| EP | 3 270 266 A2 | 1/2018 |

(Continued)

OTHER PUBLICATIONS

Office action dated Feb. 4, 2020 for the Taiwan application No. 107145272, filing date Dec. 14, 2018, p. 1-8.

(Continued)

*Primary Examiner* — Roberto W Flores
(74) *Attorney, Agent, or Firm* — Winston Hsu

(57) ABSTRACT

A tracking system is disclosed. The tracking system comprises a head-mounted display (HMD) worn on a head of a user and configured to virtualize a body movement of the user in a virtual environment; and a plurality of sensors worn on feet of the user configured to determine body information of the user according to the body movement of the user, and transmit the determined body information to the HMD; wherein the HMD virtualizes the body movement of the user according to the determined body information; wherein the body information is related to a plurality of mutual relationships between the plurality of sensors and the HMD.

14 Claims, 3 Drawing Sheets

(56) References Cited

U.S. PATENT DOCUMENTS

| | | | |
|---|---|---|---|
| 2015/0258431 A1* | 9/2015 | Stafford | A63F 13/213 463/31 |
| 2016/0187969 A1* | 6/2016 | Larsen | G06F 3/012 345/156 |
| 2017/0192496 A1 | 7/2017 | Balslev | |
| 2017/0300132 A1* | 10/2017 | Hiroi | A43B 3/0005 |
| 2018/0015327 A1* | 1/2018 | Lee | A63B 24/0006 |
| 2018/0216959 A1* | 8/2018 | Dai | B81B 7/02 |
| 2018/0326286 A1* | 11/2018 | Rathi | A63B 71/0622 |
| 2018/0335855 A1* | 11/2018 | Erivantcev | G06F 3/017 |
| 2019/0163266 A1* | 5/2019 | Johnson | G06F 3/011 |
| 2019/0212359 A1* | 7/2019 | Erivantcev | G01C 25/005 |

FOREIGN PATENT DOCUMENTS

| | | |
|---|---|---|
| JP | 2010-14712 A | 1/2010 |
| JP | 2010-240185 A | 10/2010 |
| JP | 2016-126500 A | 7/2016 |
| JP | 2017-511906 A | 4/2017 |
| WO | 2018/143360 A1 | 8/2018 |

OTHER PUBLICATIONS

Office Action dated Feb. 18, 2020 for the Japanese Application No. 2018-226577, filing date Dec. 3, 2018, pp. 1-4.
Search Report dated May 29, 2019 for EP application No. 18213371.0, pp. 1-7.

\* cited by examiner

TRACKING SYSTEM AND TACKING METHOD USING THE SAME

BACKGROUND OF THE INVENTION

1. Field of the Invention

The present invention relates to a tracking system and tracking method, and more particularly, to a tracking system and tracking method capable of virtualizing lower body behavior of a user.

2. Description of the Prior Art

With the advancement and development of technology, the demand of interactions between a computer game and a user is increased. Human-computer interaction technology, e.g. somatosensory games, virtual reality (VR) environment, augmented environment (AR) and extended reality (XR) environment, becomes popular because of its physiological and entertaining function. The conventional XR technology virtualizes the user by tracking movements of the user with an outside-in or inside-out tracking method, which traces scene coordinates of moving objects in real-time, such as head-mounted displays (HMDs), motion controller peripherals or cameras. In this way, the HMDs, the motion controller peripherals or cameras may work together to react to gestures made by the user in the virtual environment, so as to simultaneously provide interactions to the user in the virtual environment.

However, the body movements of the user are free to change positions as forward/backward (i.e. surge), up/down (i.e. heave), left/right (i.e. sway) translations in three perpendicular axes, which are combined with changes in orientation through rotation about three perpendicular axes. The conventional tracking system in the virtual environment is needed to be equipped with at least four sensors, outside-in or inside-out trackers and cameras to sense the body movements of the user, which results in inconveniences to the user when experiencing the virtual environment.

SUMMARY OF THE INVENTION

Therefore, the present invention provides a tracking system and tracking method to provide a better usage scenario to the user.

The present invention discloses a tracking system, comprising a head-mounted display (HMD) worn on a head of a user and configured to virtualize a body movement of the user in a virtual environment; and a plurality of sensors worn on feet of the user configured to determine body information of the user according to the body movement of the user, and transmit the determined body information to the HMD; wherein the HMD virtualizes the body movement of the user according to the determined body information; wherein the body information is related to a plurality of mutual relationships between the plurality of sensors and the HMD.

The present invention further discloses a tracking method, for a head-mounted display (HMD) system, wherein the HMD virtualizes a body movement of a user in a virtual environment. The tracking method comprises determining, by a plurality of sensors, the body information of the user according to the body movement of the user; and transmitting, by the plurality of sensors, the determined body information to the HMD; wherein the HMD virtualizes the body movement of the user according to the determined body information; wherein the body information is related to a plurality of mutual relationships between the plurality of sensors and the HMD; wherein the HMD is worn on a head of the user and the plurality of sensors are worn on feet of the user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
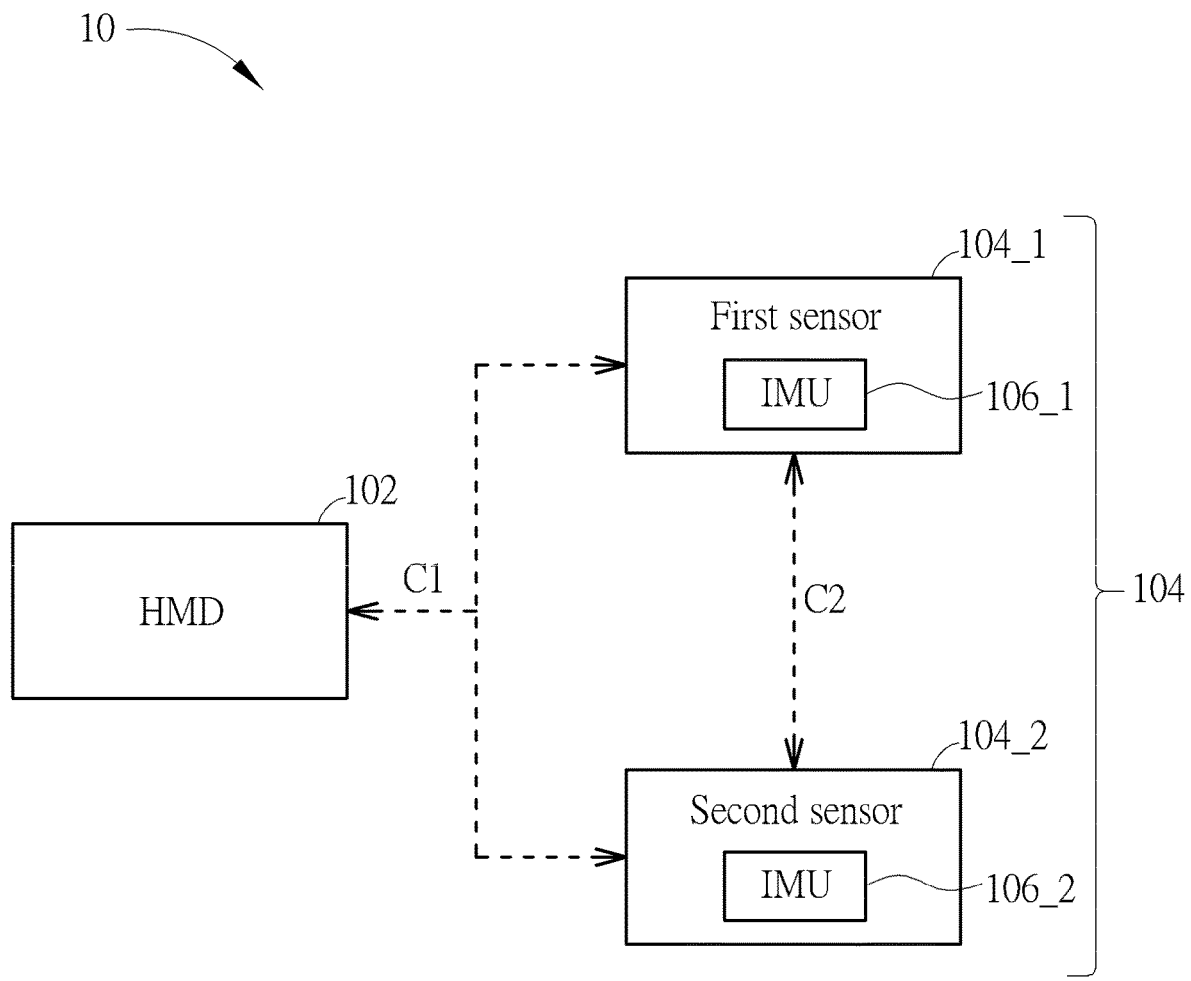
FIG. 1 is a schematic diagram of a tracking system according to an embodiment of the present invention.

Please refer to FIG. 1, which is a schematic diagram of a tracking system 10 according to an embodiment of the present invention. The tracking system 10 includes a head-mounted display (HMD) 102 and a plurality of sensors 104. The HMD 102 may be worn on a head of a user and be configured to virtualize a body movement of the user in a virtual environment. The sensors 104 may be worn on feet of the user and be configured to determine body information of the user according to the body movement of the user, and transmit the determined body information to the HMD 102, such that the HMD 102 may virtualize the body movement of the user according to the determined body information. In an example, the sensors 104 may be six degrees-of-freedom (DOF) sensors, so as to virtualize the body movement of the user in a three-dimensional space. In an embodiment, a first connection C1 between the HMD 102 and the sensors 104 is Bluetooth, and a second connection C2 between the sensors is ultrasonic, laser, or magnetic force, but not limited thereto. Notably, the body information is related to a plurality of mutual relationships between the sensors 104 and the HMD 102. Therefore, the tracking system 10 of the present invention virtualizes the body movements of the user in real-time without implementing extra outside-in or inside-out cameras or trackers, so as to improve the user experience.

The examples mentioned above briefly explain that the tracking system 10 of the present invention virtualizes the body movements of the user without implementing the outside-in or inside-out cameras or trackers. Notably, those skilled in the art may make proper modifications. For example, the first connection C1 and the second connection C2 may be implemented in any other methods capable of communicating with each other, but not limited thereto, which belongs to the scope of the present invention.

The sensors 104 of the present invention comprise a first sensor 104_1 and a second sensor 104_2. In detail, the first sensor 104_1 and the second sensor 104_2 further respectively comprise a first inertial measurement unit (IMU) 106_1 and a second IMU 106_2 to simulate a first coordinate of the first sensor 104_1, and a second coordinate of the second sensor 104_1. Since the first sensor 104_1 and the second sensor 104_2 may connect with each other via the ultrasonic, laser, or magnetic force, the coordinates of each sensor may be shared, and the exact positions of the sensors are acquainted. In other words, the first sensor 104_1 acquaints with a relative location and a relative distance of the second sensor 104_2, and the second sensor 104_2 acquaints with a relative location and a relative distance of the second sensor 104_1. Moreover, in an embodiment, the sensors 104 may connect with the HMD 102 via the Bluetooth, relative locations and relative distances between the HMD 102 and the sensors 104 are known. Consequently, the mutual locations of the HMD 102 and the sensors 104 are known by each other, such that, when the HMD 102 and the sensors 104 are worn by the user, the body movements generated by the user may be respectively determined according to the body information sensed by the sensors 104. In this way, the sensors 104 of the present invention virtualizes the body movements of the user in real-time without implementing the extra outside-in or inside-out cameras or trackers.

Figure 2:
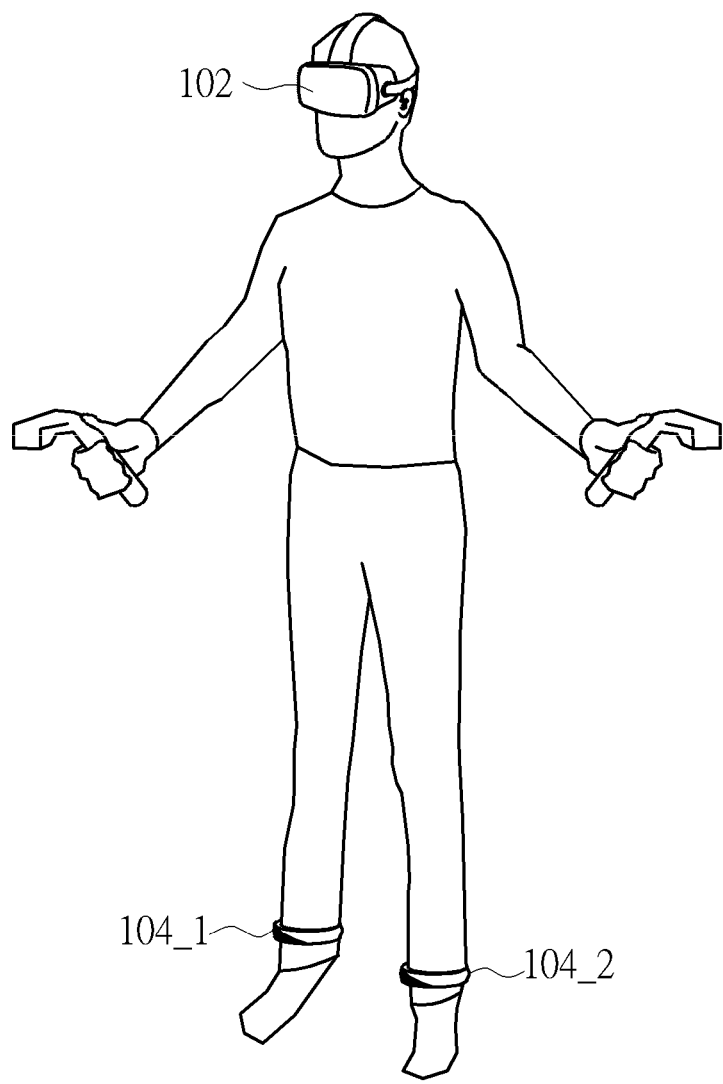
FIG. 2 is a schematic diagram of an implementation example of the tracking system according to an embodiment of the present invention.

In an embodiment, please refer to FIG. 2, which is a schematic diagram of an implementation example of the tracking system according to an embodiment of the present invention. As shown in FIG. 2, when the user is in the virtual environment and equipped with the HMD 102 and the sensors 104, the tracking system 10 is free from the outside-in or inside-out cameras or trackers to track the body movements of the user. Aside from that, the HMD 102 may connect with the sensors 104 via the first connection C1 and be informed of the relative locations and relative distances with the sensors 104. Moreover, the sensors 104 may be connected and receive coordinates from each other, such that the first coordinate and the second coordinate may be utilized for calibrating the locations of the sensors, which improves accuracy of the body information. That is, the tracking system 10 of the present invention tracks the body movements of the user without the outside-in or inside-out cameras or trackers, and improves the user experience significantly.

Figure 3:
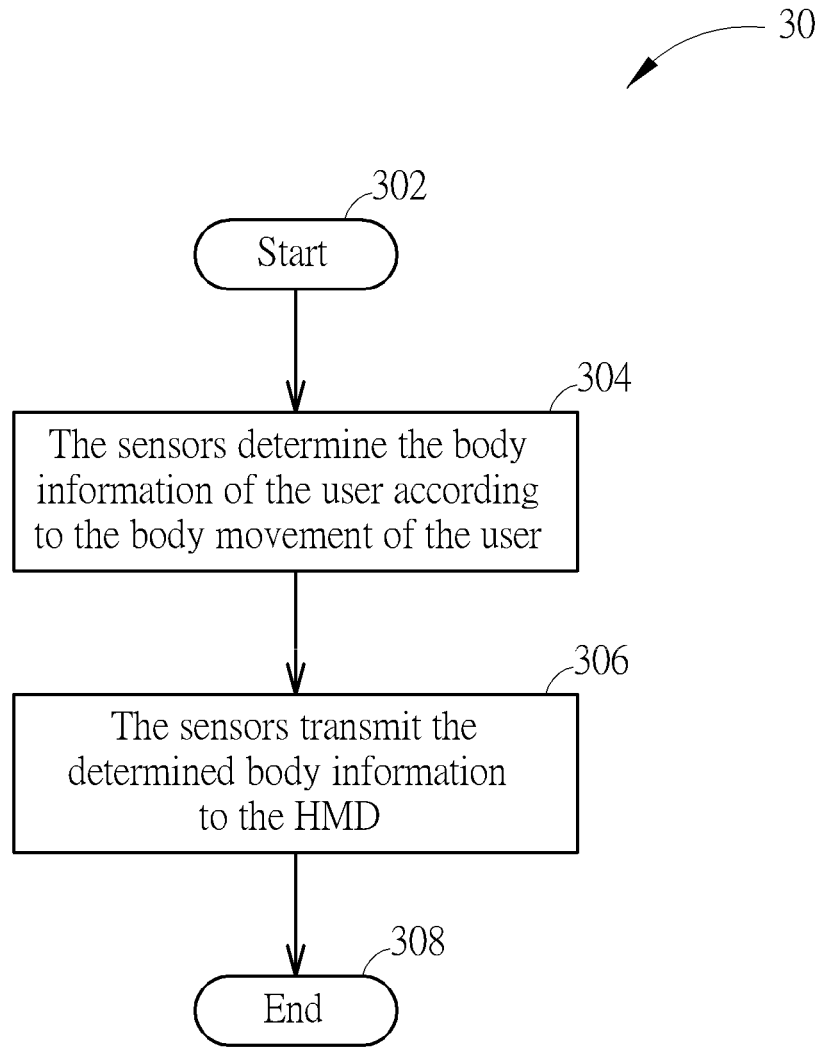
FIG. 3 is a schematic diagram of a tracking process according to an embodiment of the present invention.

Based on different applications and design concepts, the tracking system 10 of the present invention may be implemented in all kinds of methods. Furthermore, the operating process of the tracking system 10 may be concluded to a tracking process 30 as shown in FIG. 3, which includes the following steps:

Step 302: Start.

Step 304: The sensors 104 determine the body information of the user according to the body movement of the user.

Step 306: The sensors 104 transmit the determined body information to the HMD.

Step 308: End.

The details of the tracking process 30 may be referred to the above mentioned embodiments of the tracking system 10 and are not narrated herein for brevity.

Notably, the embodiments stated above illustrate the concept of the present invention, those skilled in the art may make proper modifications accordingly, and not limited thereto. A magnetic meter or a spherical antenna array may be added to the sensors to calibrate the locations of the sensors, which improves the accuracy of the virtualizations of the body movements of the user, and further improves the user experience.

In summary, the present invention provides a tracking system and a tracking method in the virtual environment without the outside-in or inside-out tracking devices, and more particularly, provides a better experience when the user experiences the virtual reality environment.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A tracking system, comprising:
a head-mounted display (HMD) worn on a head of a user and configured to virtualize a body movement of the user in a virtual environment; and
a plurality of sensors worn on feet of the user configured to determine body information of the user according to the body movement of the user, and transmit the determined body information to the HMD, each of the plurality of sensors being connected to the HMD via a first connection, the plurality of sensors being directly connected to each other via a second connection, a plurality of mutual relationships between each two of the plurality of sensors and between each of the plurality of sensors and the HMD being acquainted, each of the plurality of sensors comprising an inertial measurement unit to simulate a coordinate, each of the plurality of sensors sharing the coordinate of each of the plurality of sensors to each other via the second connection and to the HMD via the first connection;
wherein the HMD virtualizes the body movement of the user according to the determined body information;
wherein the body information is related to the plurality of mutual relationships between the each two of the plurality of sensors and between the each of the plurality of sensors and the HMD;
wherein one of plurality of sensors calibrates a relative distance and a relative location between the one and another of the plurality of sensors of the plurality of mutual relationships according to the shared coordinates via the second connection and the shared coordinates via the first connection, and the relative location and the relative distance between two of the plurality of sensors are acquainted by one of the plurality of sensors.

2. The tracking system of claim 1, wherein the plurality of sensors comprise a first sensor and a second sensor, the first sensor comprises a first inertial measurement unit (IMU) to simulate a first coordinate of the first sensor, and the second sensor comprises a second IMU to simulate a second coordinate of the second sensor.

3. The tracking system of claim 2, wherein the plurality of mutual relationships comprise a plurality of relative distances between the first sensor, the second sensor and the HMD, and relative locations between the first sensor, the second sensor and the HMD.

4. The tracking system of claim 2, wherein the first coordinate of the first sensor and the second coordinate of the second sensor are shared to each other and the HMD.

5. The tracking system of claim 1, wherein the HMD is connected to the plurality of sensors via Bluetooth.

6. The tracking system of claim 1, wherein the plurality of sensors are six degrees-of-freedom (DOF) sensors.

7. The tracking system of claim 1, wherein the plurality of sensors are connected with each other via ultrasonic, laser, or magnetic force.

8. A tracking method, for a head-mounted display (HMD) system, wherein the HMD virtualizes a body movement of a user in a virtual environment, the tracking method comprising:
determining, by a plurality of sensors, the body information of the user according to the body movement of the user;

transmitting, by the plurality of sensors, the determined body information to the HMD;
wherein the HMD virtualizes the body movement of the user according to the determined body information;
wherein the body information is related to a plurality of mutual relationships between each two of the plurality of sensors and between each of the plurality of sensors and the HMD;
wherein the HMD is worn on a head of the user and the plurality of sensors are worn on feet of the user, each of the plurality of sensors are connected to the HMD via a first connection, the plurality of sensors are directly connected to each other via a second connection, the plurality of mutual relationships between the each two of the plurality of sensors and between the each of the plurality of sensors and the HMD are acquainted, each of the plurality of sensors comprises an inertial measurement unit to simulate a coordinate, each of the plurality of sensors shares the coordinate of each of the plurality of sensors to each other via the second connection and to the HMD via the first connection; and
calibrating, by one of plurality of sensors, a relative distance and a relative location between the one and another of the plurality of sensors of the plurality of mutual relationships according to the shared coordinates via the second connection and the shared coordinates via the first connection, wherein and the relative location and the relative distance between two of the plurality of sensors are acquainted by one of the plurality of sensors.

9. The tracking method of claim 8, wherein the plurality of sensors comprise a first sensor and a second sensor, and the first sensor comprises a first inertial measurement unit (IMU) to simulate a first coordinate of the first sensor, and the second sensor comprises a second IMU to simulate a second coordinate of the second sensor.

10. The tracking method of claim 9, wherein the plurality of mutual relationships are a plurality of relative distances between the first sensor, the second sensor and the HMD, and relative locations between the first sensor, the second sensor and the HMD.

11. The tracking method of claim 9, wherein the first coordinate of the first sensor and the second coordinate of the second sensor are shared to each other and the HMD.

12. The tracking method of claim 8, wherein the HMD is connected to the plurality of sensors via Bluetooth.

13. The tracking method of claim 8, wherein the plurality of sensors are six degrees-of-freedom (DOF) sensors.

14. The tracking method of claim 8, wherein the plurality of sensors are connected with each other via ultrasonic, laser, or magnetic force.

* * * * *